May 14, 1974   F. J. VAN DEN BROEK   3,810,746
DEVICE FOR SEALING ELECTRIC FILAMENT LAMPS OR DISCHARGE TUBES
Original Filed July 9, 1969   2 Sheets-Sheet 1

INVENTOR.
FRANCISCUS J. VAN DER BROEK
BY
AGENT

May 14, 1974   F. J. VAN DEN BROEK   3,810,746
DEVICE FOR SEALING ELECTRIC FILAMENT LAMPS OR DISCHARGE TUBES
Original Filed July 9, 1969   2 Sheets-Sheet 2

INVENTOR.
FRANCISCUS J. VAN DER BROEK

United States Patent Office 3,810,746
Patented May 14, 1974

3,810,746
DEVICE FOR SEALING ELECTRIC FILAMENT LAMPS OR DISCHARGE TUBES
Franciscus Josephus van den Broek, Emmasingel, Eindhoven, Netherlands, assignor to U.S. Philips Corporation, New York, N.Y.
Continuation of abandoned application Ser. No. 840,223, July 9, 1969. This application Sept. 16, 1971, Ser. No. 181,194
Claims priority, application Netherlands, July 6, 1968, 6809597
Int. Cl. C03b 23/14
U.S. Cl. 65—140    2 Claims

ABSTRACT OF THE DISCLOSURE

A burner device for use in sealing pinch-type lamps, the burner having a plurality of nozzle orifices directed toward a lamp's sealing region with the lower nozzles preferably of square cross-section conveying only gas, and the upper nozzles preferably of circular cross-section conveying oxygen, with additional gas conveyed between said oxygen nozzles.

---

This is a continuation of application Ser. No. 840,223, filed July 9, 1969, now abandoned.

In one known device for sealing electric filament lamps or discharge tubes, there is a set consisting of a filament having two pole wires in which molybdenum foils are incorporated arranged in a jig; and around the set a glass envelope can be placed which in the finished lamp or tube constitutes the envelope, a pinching device with burners is arranged around the region where the foils of the set are to be sealed in the glass, the burners comprising a number of orifices for a gas and a number of orifices for oxygen at the area of the orifices directed to the sealing region. In these burners mixing of the gas and oxygen takes place outside the nozzle.

In this type of sealing devices, in which sealing of the set takes place at the lower side of the envelope, the drawback sometimes occurs that when the lamp or tube is finished, one or both molybdenum foils present in the lamp is damaged, for example, by cracks, which leads to a useless product. This drawback is due to oxidation of the foil owing to the occurrence of flame strike inside the envelope, or by the introduction of unburned oxygen in the envelope along the gap between the lower side of the glass envelope and the supporting device of said envelope and the set, this in spite of the fact that a current of a protective gas, for example, nitrogen or argon, is maintained via the upper end of the envelope during heating and pinching of the envelope.

According to the present invention this drawback is avoided by using a special burner construction. The device for sealing electric filament lamps or discharge tubes of the type mentioned in the preamble is characterized in that the lower part of each nozzle has only orifices for the gas, and the upper part of each nozzle has orifices for the gas arranged between the orifices for the oxygen.

According to a structurally simple embodiment of the said device, each nozzle directed to the sealing region comprises at its lower side a number of adjoining orifices for the gas which are rectangular, particularly square in cross-section, while in the upper part thereof the gas orifices are constituted by the ends of a number of circular tubes, the intermediate spaces between said circular tubes serving as supply channels for oxygen.

Figure 1:
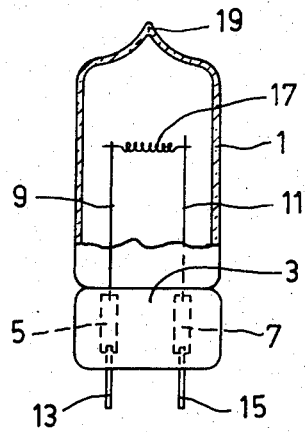
Figure 2:
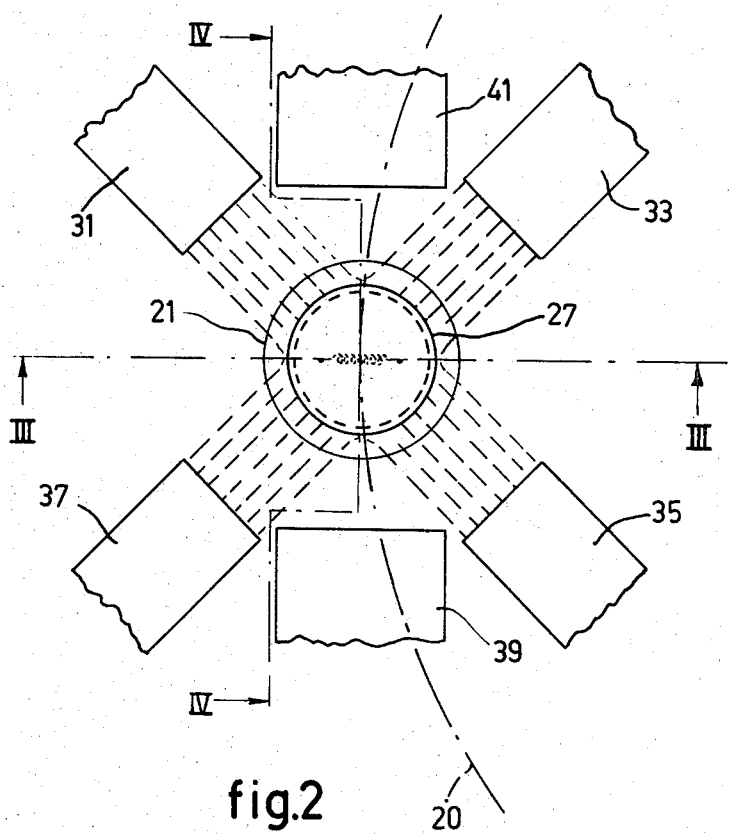
Figure 3:
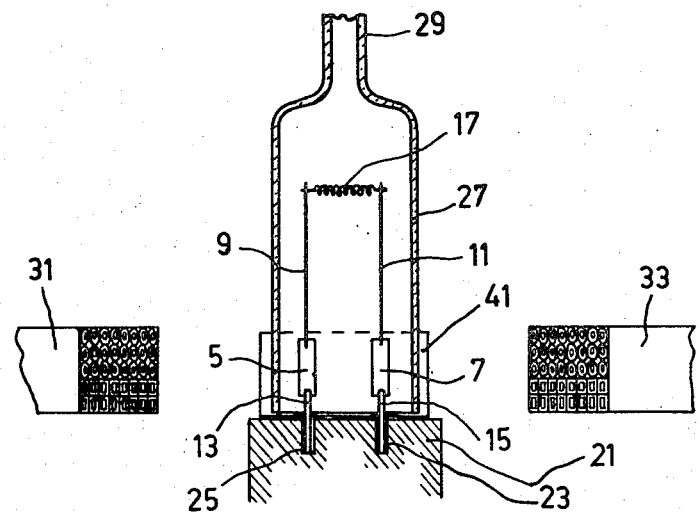
Figure 4:
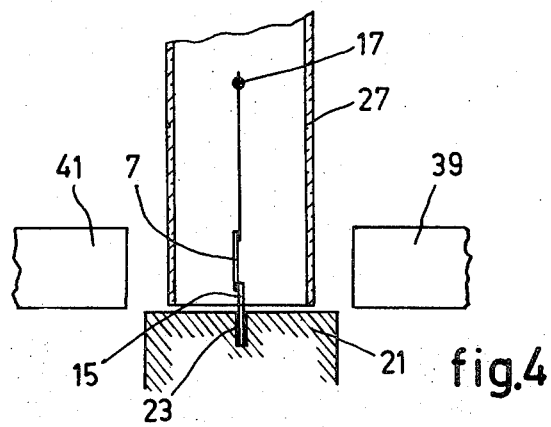
Figure 5:
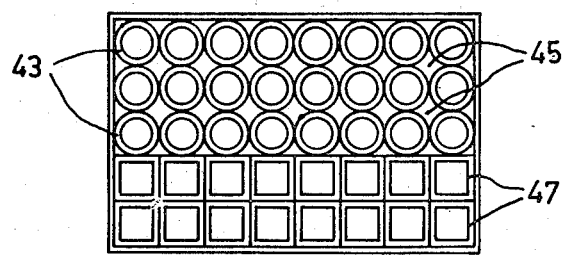

In order that the invention may be readily carried into effect, it will now be described in greater detail, by way of example, with reference to the accompanying drawings in which FIG. 1 diagrammatically shows a filament lamp to be manufactured.
FIG. 2 diagrammatically shows the burners and pinchers to be used in manufacturing the lamp shown in FIG. 1.
FIGS. 3 and 4 are cross-sectional views taken on the lines III—III and IV—IV, respectively, of FIG. 2.
FIG. 5 is a front elevation of one of the nozzles used in said arrangement.

The filament lamp shown in FIG. 1 comprises a cylindrical envelope 1 of quartz glass, the lower end of which is deformed to a flat pinch 3. Metal foils 5 and 7 are incorporated in said pinch. Pole wires 9 and 11 and current supply wires 13 and 15 are secured to said foils. A filament 17 is stretched between the pole wires 9 and 11. The envelope 1 furthermore comprises a sealed tip 19.

In a device often used for manufacturing such a lamp, a jig 21 is used which can be stepwise moved according to a track 20 and which comprises two apertures 23 and 25 in which the wires 13 and 15 and the filament 17 are placed. A tubular envelope 27 which is formed as an exhaust tube 29 at its upper end and consists of quartz glass is then arranged around said assembly. This situation is shown in FIGS. 3 and 4.

As is shown in particular in FIG. 2 gas-oxygen burners and pinching blocks are accommodated around the glass envelope 27. The burners are denoted by 31, 33, 35, 37 and are stationary, while the pinching blocks which can be moved towards each other and are denoted by 39 and 41 are brought in the track 20 during a stationary period of the jig 21 which is moved along the said track and occupy a position therein as is shown in FIG. 2.

After the lower part of an envelope 27 has been softened by the heat of the burners 31, 33, 35, 37, the pinching blocks 39 and 41 are moved towards each other and the lower part of the envelope 27 is deformed to a flat pinch 3 in which the foils 5 and 7 are entirely sealed. The blocks 39 and 41, the shape of which will not be described since they are of any conventional construction, are then again moved apart and moved out of the track 20. The resulting lamp vessel which is closed on one side, is then evacuated through its exhaust tube 29, filled, if desirable, and the exhaust tube 29 is then sealed in a likewise conventional manner.

FIG. 5 is a front elevation of the gas-oxygen burners 31, 33, 35, 37. The nozzles of said burners comprises a number of parallel arranged tubes 43 through which gas is transported. The spaces 45 between said tubes 43 communicate with an oxygen supply. The gas and the oxygen are mixed outside the nozzle (see FIG. 5).

According to the invention, no oxygen is applied to the lower part of the cross-section of each burner. The orifices at that location are constituted by the orifices of square tubes engaging each other through which tubes only gas is conveyed. This is obtained, for example, by deforming the circular tubes 43, in so far as they are situated at the lower edge of the nozzle, by means of a suitable tool in such manner that they obtain a square cross-section as denoted by 47 in FIG. 5. In this manner a burner construction is obtained in which substantially no oxygen is present in the lower limit of the stream of the emerging mixed gas with oxygen. When such a flame is directed to the lower side of the glass envelope 27, gas is supplied only in the gap-shaped space which always remains between said envelope and the outside of the jig 21 gas is supplied only in said space and the supply of oxygen any supply of oxygen to this area is substantially avoided. This prevents the undesirable oxidation of the material of the foils 5 and 7 upon heating the envelope 27. The number of square channels 47 is best determined experimentally. Sometimes even two rows of channels 47 may be necessary as in the case described here.

What is claimed is:
1. In apparatus for heating and sealing the base portion of a glass envelope containing electrical elements for a filament lamp or discharge tube, said apparatus of the type having a jig for holding the envelope, means to compress the base portion of the envelope and means to supply a source of flame to said base portion, the improvement comprising:
   a nozzle arrangement having an upper and lower set of tubes having inlet ports and outlet ports, said upper set of tubes being of cylindrical shape, said cylindrical tubes being tangent to one another and forming interstitial passages therebetween, said lower set of tubes having rectangular cross section, said rectangular tubes being in flush contact with each other so as to prevent passage of gas between said tubes; and
   means to supply combustible gas to the inlet ports of both sets and oxygen to the interstitial passages whereby the combustible gas emerging from said upper ports is rich in oxygen and the combustible gas emerging from said lower ports are poor in oxygen.
2. A nozzle arrangement for supplying flames of different oxygen content to a work piece comprising:
   a first set of tubes having inlet ports and outlet ports, said tubes having a generally cylindrical shape, each of said cylindrical tubes being tangent to one another and forming interstitial passages therebetween;
   a second set of tubes below said first set of tubes having inlet ports and outlet ports, said tubes having a generally rectangular cross-section, each of said tubes being in flush contact with one another so as to prevent passage of gas between said second set of tubes;
   means for supplying a combustible gas to the inlet ports of both tubes; and
   means for supplying an oxygen-containing gas to said interstitial passages.

References Cited
UNITED STATES PATENTS

| | | | |
|---|---|---|---|
| 3,285,725 | 11/1966 | Loughridge | 65—59 X |
| 3,419,947 | 1/1969 | Gottschalk et al. | 65—59 X |
| 3,504,994 | 4/1970 | Desty et al. | 431—174 |

ROBERT L. LINDSAY, JR., Primary Examiner.

U.S. Cl. X.R.

65—154, 155; 431—173, 328

PO-1050
(5/69)

UNITED STATES PATENT OFFICE
CERTIFICATE OF CORRECTION

Patent No. 3810746                      Dated May 14, 1974

Inventor(s) FRANCISCUS JOSEPHUS VAN DEN BROEK

It is certified that error appears in the above-identified patent and that said Letters Patent are hereby corrected as shown below:

Column 1, line 32, after "envelope" cancel the comma (,)

and insert a period --.--

Column 2, line 65, after "21" delete

"gas is supplied only in said space"

lines 65 and 66, delete

"the supply of oxygen"

Signed and sealed this 24th day of September 1974.

(SEAL)
Attest:

McCOY M. GIBSON JR.              C. MARSHALL DANN
Attesting Officer                Commissioner of Patents